(12) United States Patent
Eberlein et al.

(10) Patent No.: US 11,914,574 B2
(45) Date of Patent: Feb. 27, 2024

(54) GENERATION OF INCONSISTENT TESTING DATA

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 83 days.

(21) Appl. No.: 17/714,611

(22) Filed: Apr. 6, 2022

(65) Prior Publication Data
US 2023/0325377 A1    Oct. 12, 2023

(51) Int. Cl.
*G06F 16/23*    (2019.01)
*G06F 11/36*    (2006.01)
*G06F 16/215*   (2019.01)
*G06F 16/22*    (2019.01)

(52) U.S. Cl.
CPC ...... *G06F 16/2365* (2019.01); *G06F 11/3692* (2013.01); *G06F 16/215* (2019.01); *G06F 16/2282* (2019.01)

(58) Field of Classification Search
None
See application file for complete search history.

(56) References Cited

U.S. PATENT DOCUMENTS

| | | | | |
|---|---|---|---|---|
| 8,549,045 | B2* | 10/2013 | Clifford | G06F 11/3684 707/802 |
| 8,549,046 | B2* | 10/2013 | Clifford | G06F 11/3684 707/802 |
| 11,709,819 | B2* | 7/2023 | Tirapu Azpiroz | G06N 5/022 702/22 |
| 11,720,482 | B1* | 8/2023 | Chauhan | G06F 11/3664 717/124 |
| 2012/0030168 | A1* | 2/2012 | Weissenberger | G06Q 10/00 707/611 |
| 2012/0215815 | A1* | 8/2012 | Clifford | G06F 16/21 707/802 |
| 2013/0007062 | A1* | 1/2013 | Dutta | G06F 16/215 707/E17.055 |
| 2022/0067024 | A1* | 3/2022 | Pethe | G06F 16/25 |
| 2022/0100731 | A1* | 3/2022 | Tirapu Azpiroz | G01N 33/02 |
| 2023/0325377 | A1* | 10/2023 | Eberlein | G06F 11/3692 707/690 |

* cited by examiner

*Primary Examiner* — Kim T Nguyen
(74) *Attorney, Agent, or Firm* — Buckley, Maschoff & Talwalkar LLC (57) ABSTRACT

Systems and methods include determination of first constraints on columns of database tables of a test tenant system based on metadata associated with the columns of database tables, determination of second constraints on the columns of database tables based on data stored in the columns of database tables of the test tenant system, identification of inconsistent data stored in columns of database tables of a plurality of tenant systems based on the first constraints and the second constraints, adding of records to the database tables of the test tenant system based on the identified inconsistent data, and execution of a test based on the database tables of the test tenant system including the added records.

20 Claims, 5 Drawing Sheets

GENERATION OF INCONSISTENT TESTING DATA

BACKGROUND

Modern computing systems execute applications to provide functionality to users. Applications typically operate based on a complex data model which defines associations between data objects, foreign key relationships between database tables, and constraints on data elements in table columns such as data type and data format constraints. Thusly-constrained application data may be replicated to a secondary persistency and/or persisted across distributed data stores.

Stored application data might not always conform to the constraints defined by the data model. Such non-conforming data is referred to herein as inconsistent data. Errors in the program code of an application may cause the application to write inconsistent data to a data store, either because the code fails to detect inconsistencies in input write data or itself creates and writes inconsistent data. In the case of a distributed persistency, inconsistent data can arise if a distributed process fails and data is only partially written due to an incomplete joint transaction. Inconsistent data may also result from an incomplete backup restoration, replication errors, or inconsistent data deletion (e.g., resulting in invalid associations).

Mass data upload mechanisms may be used to migrate application data from legacy systems, or to input application data from an external source. These mechanisms may include fewer consistency checks than the corresponding application and therefore create and store inconsistent data. Side channel access may also bypass consistency checks of an application and corrupt existing data as a result. For example, a custom UI of a secondary system may use an Application Programming Interface (API) to add data to a primary system but might unknowingly fail to include UI-side checks which would typically be applied by the corresponding UI of the primary system.

It is therefore preferable to design applications to cope with potential inconsistent application data. Secondary systems (e.g., analytics, machine learning, extensions, add-ons, upgrade migration routines) which access the application data of a primary system should also be capable of handling inconsistencies in the application data. These goals may be furthered by testing and debugging such applications and secondary systems using inconsistent (as well as consistent) data.

In one conventional approach, random inconsistencies are included within application data and the thusly-modified application data is used for testing applications or systems which use the application data. This approach is typically unsuitable due to the difficulty of coding an application to address all possible inconsistencies. Moreover, it is particularly inefficient to code an application against inconsistencies that would never occur in operation.

DETAILED DESCRIPTION

The following description is provided to enable any person in the art to make and use the described embodiments. Various modifications, however, will be readily apparent to those in the art.

Generally, some embodiments facilitate the generation of test data which contains actual inconsistencies observed in one or more sets of tenant data. The test data may include consistent data as well as inconsistent data which exhibits a superset of the observed inconsistencies. The test data may also be anonymized in a manner which addresses privacy concerns.

According to some embodiments, first consistency constraints are read from metadata describing the data model of an application. The data of one or more "test" tenants of the application is analyzed to identify second consistency constraints. Next, inconsistent data is identified within data of other tenants by evaluating the data against the first and second consistency constraints. Inconsistent data is then added to the data of each of the one or more test tenants based on the identified inconsistent data. The thusly-modified test tenants may be used to test a data consumer, such as an upgraded version of the application, a secondary system, etc.

Figure 1:
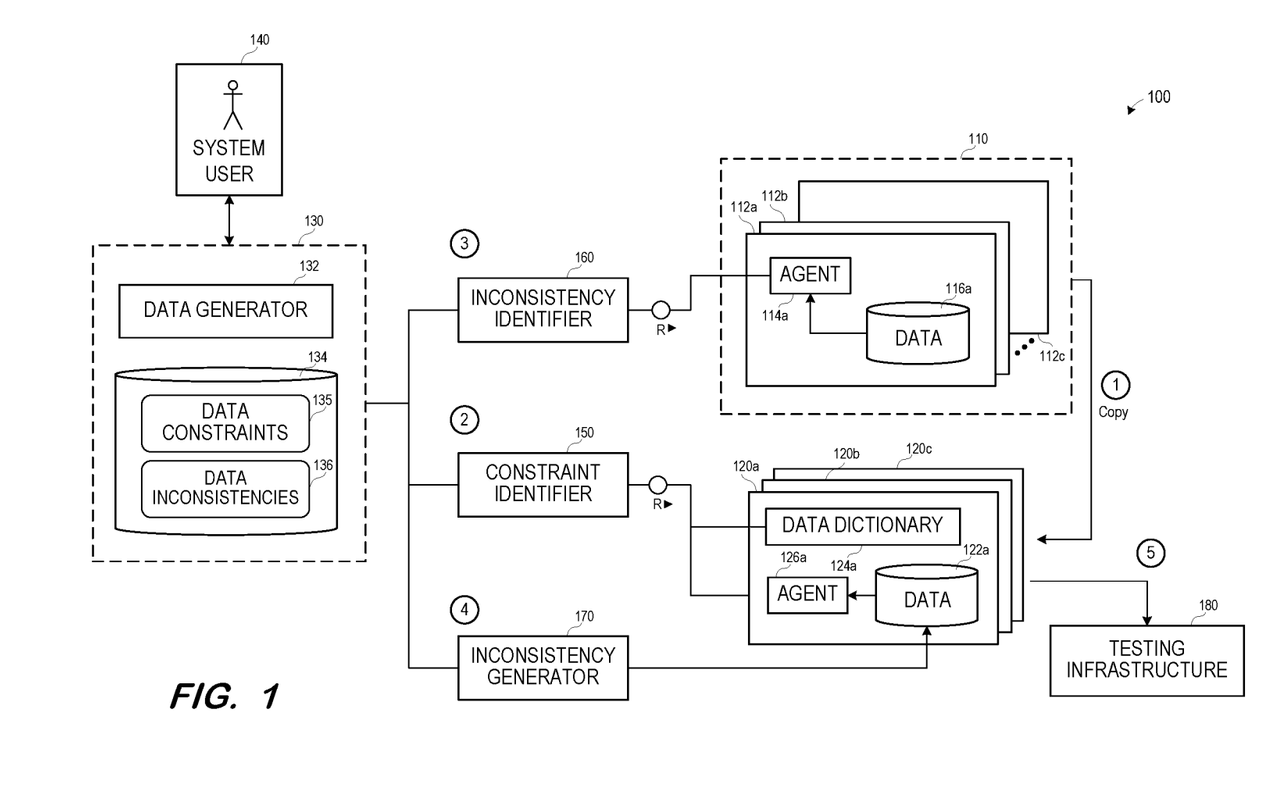
FIG. 1 is a block diagram of an architecture for generating inconsistent test data according to some embodiments.

FIG. 1 is a block diagram of architecture 100 for generating inconsistent test data according to some embodiments. The illustrated elements of architecture 100 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented using cloud-based resources, and/or other systems which apportion computing resources elastically according to demand, need, price, and/or any other metric.

Tenant systems 110 may comprise logically-separated sets of data associated with a particular one or more applications. For example, each of tenant systems 112a, 112b and 112c may comprise a separate computer server including separate data storage, with each separate computer server executing an instance of a same application with respect to the data (e.g., data 116a) stored in its respective separate storage. A computer server as described herein provides a platform and services for execution of applications as is known in the art. Such a platform may include required hardware (including virtualized hardware of a virtual machine), an operating system, device drivers, data and lifecycle management services, etc.

In another example, two or more of tenant systems 112a, 112b and 112c are implemented by a single computer server executing an instance of an application which is accessible to users of each of the two or more tenant systems. The data of each of the two or more tenants may be stored in a same data storage but is logically segregated via mechanisms provided by the application such that users of one tenant system are unable to access data of the other tenant system. Data of a particular tenant system 110 may include data specific to the particular tenant system as well as tenant-independent data which is also stored within the other ones of tenant systems 110.

Test tenant systems 120a, 120b and 120c may be implemented by one or more computer servers as described above with respect to tenant systems 110 and is associated with a same one or more applications as tenant systems 110. The data (e.g., data 122a) of each of test tenant systems 120a, 120b and 120c comprises a copy of data (e.g., data 116a) of a respective one of tenant systems 110. Each of test tenant systems 120a, 120b and 120c stores a data dictionary (e.g., data dictionary 124a) copied from its respective tenant system 110, which includes metadata defining the data stored therein.

The number of test tenant systems is typically smaller than the number of tenant systems 110. In one example, tenant systems 110 comprise ten or more tenant systems, three of tenant systems 110 are selected and the data of each one of the selected tenant systems 110 is copied to one of test tenant systems 120a, 120b and 120c. Also copied is a data dictionary of an application associated with the copied data. Embodiments are not limited to three test tenant systems and may comprise one or more test tenant systems. As will be described below, using more than one test tenant system may facilitate the determination of constraints based on the stored data.

System 130 may comprise any computing system suitable to execute program code of data generator 132. Storage 134 may comprise any standalone or distributed storage system that is or becomes known, including but not limited to a database system which is separate from the hardware implementing system 130. In this regard, system 130 is depicted using a dashed line to indicate that the components thereof may be located remote from one another, and in an on-premise, cloud-based or hybrid configuration.

System user 140 may operate a Web browser to issue a HyperText Transfer Protocol (HTTP) request including a Uniform Resource Locator (URL) associated with data generator 132 and receive a user interface therefrom in response. User 140 enters credentials into the user interface and is authenticated, which initiates an exchange of commands and information between system user 140 and data generator 132 to configure the copying of one or more tenant systems 110 to respective test tenant systems as described above and to initiate generation of test data within the test tenant systems. Embodiments are not limited to the foregoing scenario.

Once test tenant systems 120a, 120b and 120c are created, data generator 132 calls constraint identifier 150 to determine constraints based on the data of systems 120a, 120b and 120c. In response, constraint identifier 150 reads the constraints defined in metadata of data dictionary 124a. Such constraints may include but are not limited to semantic data types (e.g., "NUMC"=a number stored in a string or character field, "DATE" and "TIME"=values stored in a string or character field) and foreign key relationships. The data dictionary of each test tenant system 120a, 120b and 120c may be identical, in which case constraint identifier 150 need only read one data dictionary. The constraints which are determined based on the metadata are stored in data constraints 135 of storage 134. Storage of a constraint may comprise storage of a record associating an identifier of the constraint with identifiers of the table(s) and column(s) subject to the constraint, the constraint type, and optional sample values.

Constraint identifier 150 also calls an agent (e.g., agent 126a) on each test tenant system to identify constraints based on the data (e.g., data 122a) of the test tenant system. The agent scans the columns of stored database tables and determines, based on the set of values contained in each column, one or more constraints associated with the columns. For example, if column C1 of table TAB1 contains only values which are in the set of values stored in column CS of table TAB2, a foreign key constraint may be determined to exist between columns C1 and CS. Such a foreign key constraint might not be specified in the data dictionary but is instead enforced by the application. In another example, two columns of two tables may contain the exact same number of records and the same values per record. An agent may determine that the two columns are subject to a matching row set constraint.

Determination of constraints by the agent may also include parsing values of a column with regular expressions to identify whether the column exclusively includes data of a certain data type. Data types which might be detectable via regular expressions include but are not limited to: e-mail address; date and time; URL; street address; telephone number; VAT number; credit card number; and globally unique identifier (GUID). To reduce an amount of time required for such parsing, the parsing may be limited to those columns associated with VARCHAR and STRING data types.

An agent within a test tenant system may also determine a number of different values contained in a column. If the number of different values is insignificant compared to the number of records in the column (e.g., less than $1/1000$ or $1/10000$), the set of different values is considered a constraint on the column and the set is stored in data constraints 135 in association with the table name and the column name. In another example, a data dictionary may define the data type of a column as CHAR(1) but only the values ("X" or " ") are stored in the column, or as CHAR(2) but only country codes are stored in the column, or as INTEGER but only 0 and 1 are stored in the column. Accordingly, the agent determines that the values of the column are constrained to the particular stored values and stores the set of values in data constraints 135 in association with the table name and the column name.

The agent may skip the above-described value set constraint evaluation for columns which are tagged (e.g., by the data dictionary) as Data Privacy and Protection (DPP) relevant. The agent may also skip the above-described value set constraint evaluation for columns which are constrained by a foreign key relation, in which case only the foreign key constraint is stored in data constraints 135 as described above.

In another example, an agent may determine whether a column of data in a test tenant system contains a distinct set of values (i.e., no duplicate entries). If several test tenant systems are available, the column is read in all systems to determine whether the column includes distinct values in each system. If so (or, in some embodiments, if the column includes distinct values in a majority of systems), a distinct value set constraint is associated with the column and the table in data constraints 135. The distinct value set constraint evaluation may be skipped for columns which are tagged as DPP relevant.

The determination of constraints by an agent within a test tenant system may be time and resource intensive, particularly for large databases including many tables and many columns. Some embodiments therefore pre-filter the columns to identify those which need not be evaluated during constraint determination. For example, comparisons may only occur between columns which are associated with a same database type (e.g., CHAR(5)) and which include the same (or a similar) number of distinct values (e.g., SELECT C1 from TAB1, where C1 not in (SELECT DISTINCT CS from TAB2)). In another example, if a column C1 is related to another column CS and C1 only contains values which are in the set of values stored in CS, C1 is not checked for relationships to other columns of other tables.

After constraint identifier 150 has stored the identified data constraints of each of tenant systems 120a, 120b and 120c in data constraints 135, data generator 132 may instruct inconsistency identifier 160 to identify inconsistencies in tenant systems 110 based on the identified constraints. According to some embodiments, a small subset of tenant systems are copied to test tenant systems from which constraints are identified, while all of the tenant systems are scanned for inconsistencies based on those constraints.

Stored data values which violate a constraint are considered to be inconsistencies. Inconsistency identifier 160 begins the identification by reading the constraints stored in data constraints 135. Based on the stored records, inconsistency identifier 160 identifies one or more associated tables and columns table-name, a constraint type, and optional sample values for each constraint.

Inconsistency identifier 160 calls an agent located within each of tenant systems 110 to determine inconsistencies within the data stored therein. In this regard, agent 114a of tenant system 112a evaluates data 116a against the constraints read by inconsistency identifier 160. Each tenant system 112a, 112b and 112c may include a respective agent which is called by inconsistency identifier 160 to evaluate its respective data as described above.

If a violation of a constraint is identified, and as long as the corresponding table of data 116a is not marked as "no-copy" or the like, agent 114a collects a representative subset of the records of data 116a which correspond to the violation. These records are passed to inconsistency identifier 160 and stored in data inconsistencies 136 of storage 134. Each inconsistency may be stored in association with the table and column in which the inconsistency was found, the constraint type which was violated, and the subset of records exhibiting the inconsistency.

In one example, a stored constraint is a value set constraint and is associated with a set of values and a table column. Agent 114a therefore determines whether any values which are not in the set of values are located in the table column as stored in data 116a. If so, records containing the violating values are stored in data inconsistencies 136. For a table column which is constrained to include distinct values (and which may also be constrained by a value set constraint as described above), agent 114a determines if the table column includes any duplicate values. If so, a subset of rows including duplicate values in the table column is stored in data inconsistencies 136.

In another example, a table column is subject to a formatting constraint. The table column is scanned for values which do not match a regular expression which corresponds to the formatting constraint. If such values are found, records including these values are stored data inconsistencies 136. If the values should not be stored for confidentiality reasons (e.g., credit card number, e-mail address, home addresses), the deviation of the values from the regular expression is determined and the deviation pattern (e.g., the '@' character in an e-mail address is substituted with the '&' character) is stored in data inconsistencies 136 in association with the table and column identifiers.

If a table column is subject to a foreign key constraint, agent 114a scans the table column of data 116a for values which are not contained in the other table column of the foreign key constraint. If any such values are found, a record is stored in data inconsistencies 136 indicating that the table column contains values which violate the foreign key constraint.

Data generator 132 calls inconsistency generator 170 after inconsistency identifier 160 has queried an agent of each of tenant systems 110 for inconsistencies in its respective stored data, and stored records associated with those inconsistencies in data inconsistencies 136. Generally, inconsistency generator 170 modifies each of test tenant systems 120a, 120b and 120c to exhibit the identified inconsistencies.

For inconsistencies which are associated with sample records within data inconsistencies 136, inconsistency generator 170 may simply insert these records into the corresponding tables of each of test tenant systems 120a, 120b and 120c. As described above, data inconsistencies 136 may also include inconsistencies which are not associated with sample records but with a deviation pattern. For such inconsistencies, inconsistency generator 170 operates to create one or more sample records based on the deviation pattern and to insert the created sample records into corresponding tables of each of test tenant systems 120a, 120b and 120c. Referring to the prior example, records may be created including e-mail addresses such as 'firstlast&domain.com'. If the corresponding table includes several columns, then an existing record of the table may be updated with the generated inconsistent value instead of generating data for the other columns in order to create a full sample record for insertion into the table.

Figure 2:
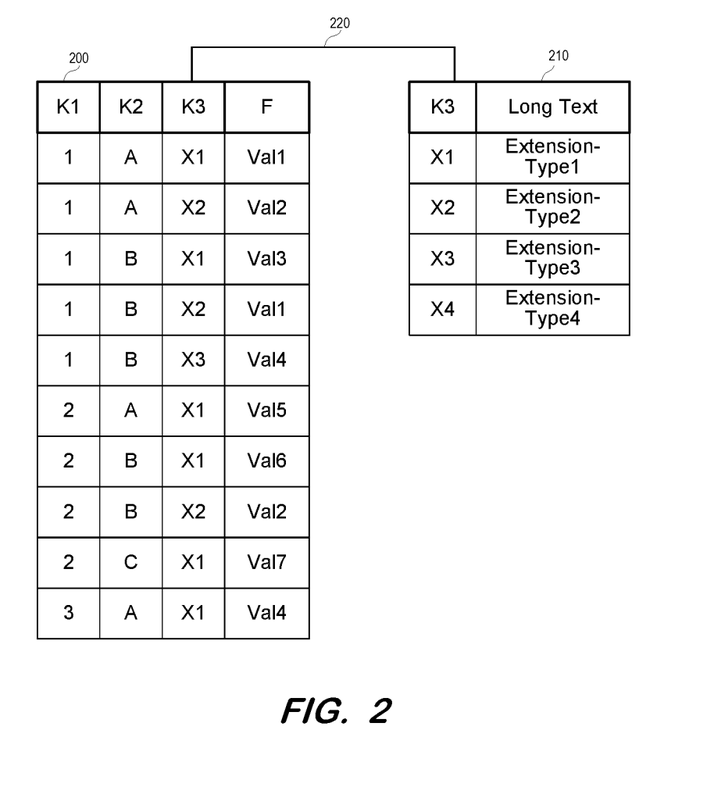
FIG. 2 includes a tabular representations of database tables for describing constraint determination according to some embodiments.

Inconsistencies which are associated with foreign key constraints may be created in each of test tenant systems 120a, 120b and 120c by deleting a value of an existing entry in the corresponding check table. FIG. 2 illustrates tabular representations of portions of foreign key table 200 and check table 210 of a test tenant system according to some embodiments. As shown, column K3 is a foreign key column and all values of column K3 in table 200 must be uniquely present in column K3 of table 210. If data inconsistencies 136 stores an inconsistency associated with the foreign key constraint on column K3 of table 200, inconsistency generator 170 may recreate this inconsistency in table 200 of the test tenant system by deleting a record of table 210 which includes a value which is present in column K3 of table 200. If table 200 is empty in the test tenant system, a workflow may be available for the user to create a consistent entry in the table, which is then rendered inconsistent by deleting the check table record as described above.

Once inconsistency generator 170 has modified each of test tenant systems 120a, 120b and 120c to exhibit the identified inconsistencies, test tenants 120a, 120b and 120c and their modified data may be used to test consumers of the data via testing infrastructure 180. Testing infrastructure 180 may comprise a system running an upgraded version of the application executing on tenant systems 110, a replication system to replicate the test tenant data to an analytics system, or any other suitable consumer.

Figure 3:
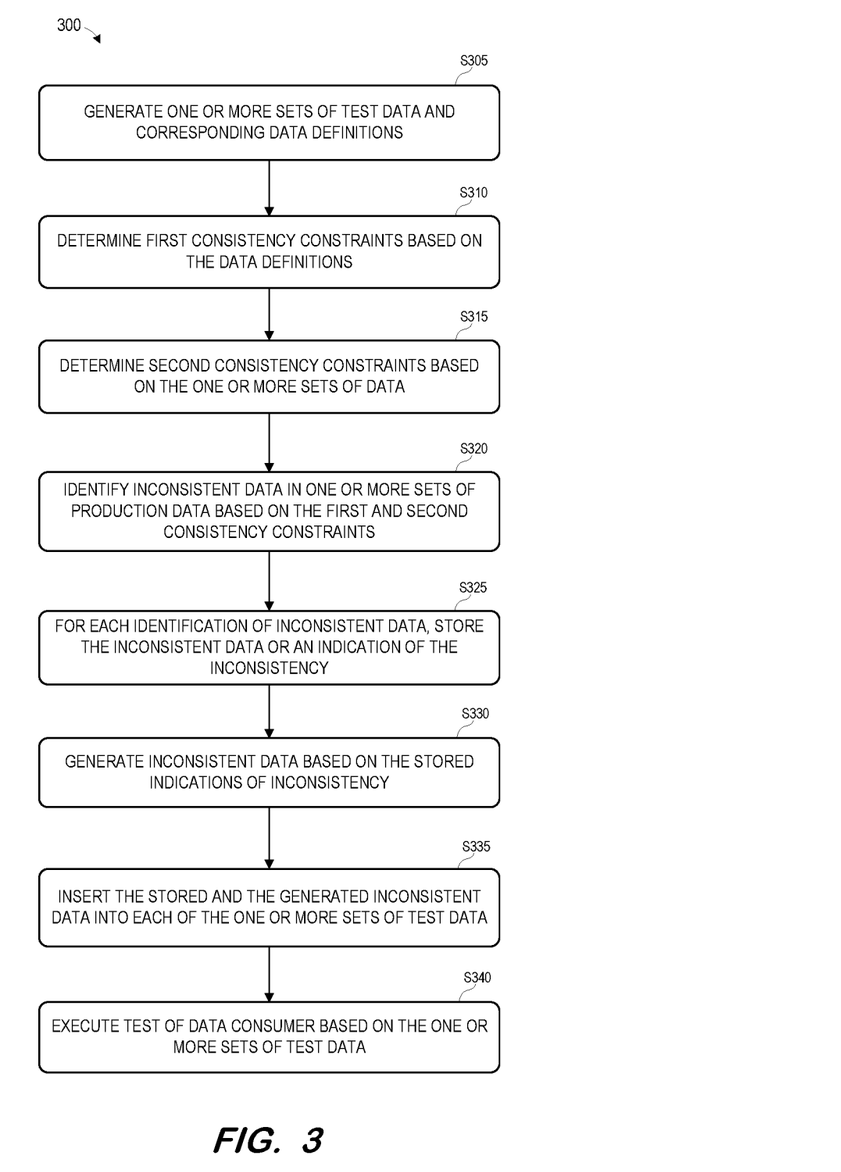
FIG. 3 is a flow diagram of a process for generating inconsistent test data according to some embodiments.

FIG. 3 comprises a flow diagram of process 300 to generate inconsistent test data according to some embodiments. Process 300 may be performed by architecture 100, but embodiments are not limited thereto. Process 300 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

S305 comprises generation of one or more sets of test data and corresponding data definitions. In one example, each of the one or more sets of test data and corresponding data definitions are copied from a respective production system, such as one of tenant systems 110, into a test system, such as one of test tenant systems 120a, 120b and 120c. The data definitions may comprise data dictionaries associated with the one or more sets of test data, which define an application data model to which the one or more sets of test data conforms as is known in the art.

Figure 4:
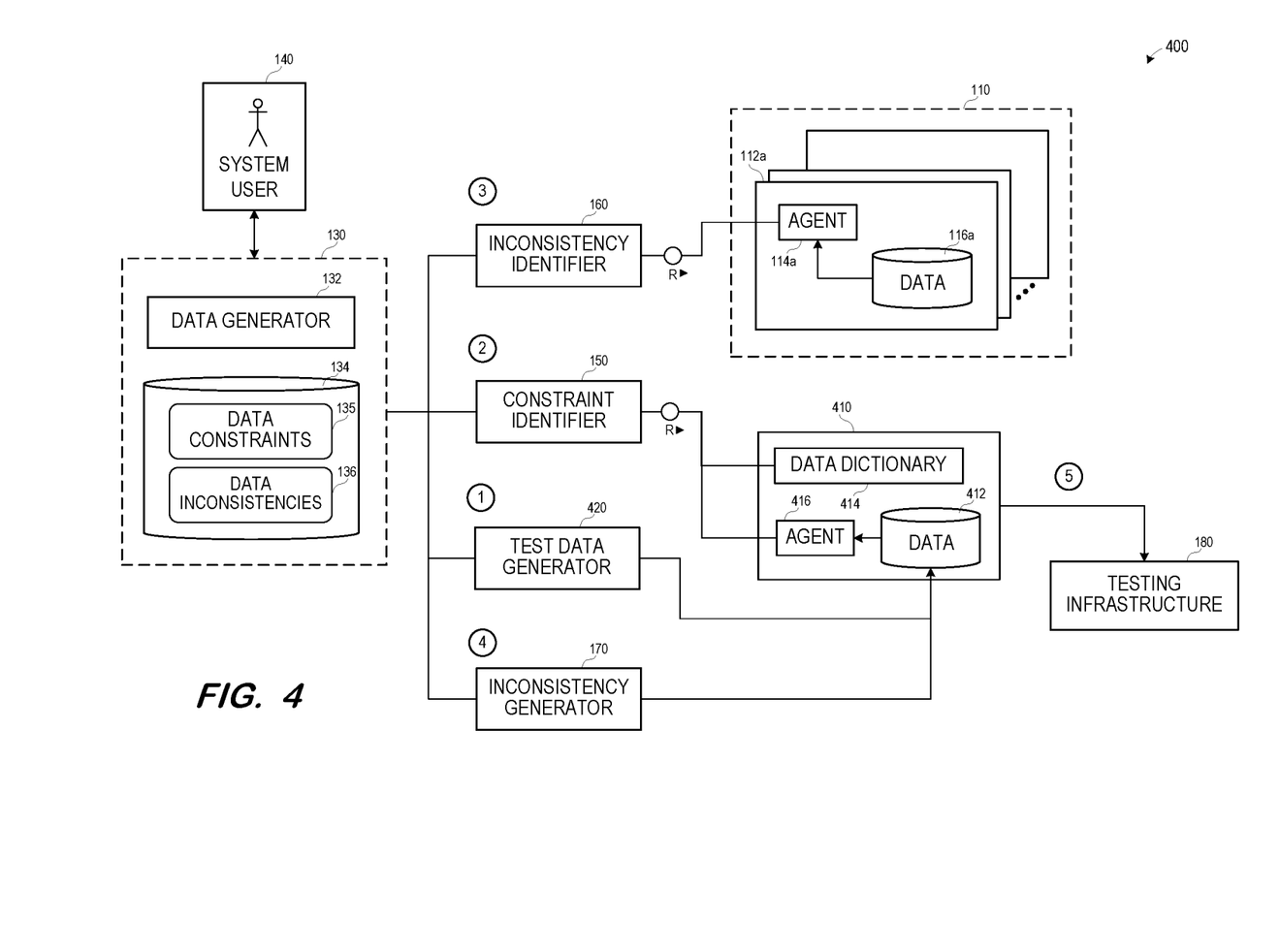
FIG. 4 is a block diagram of an architecture for generating inconsistent test data according to some embodiments.

In another example, the one or more sets of data are generated rather than copied at S305. FIG. 4 illustrates architecture 400 which is similar to architecture 100 of FIG. 1. According to architecture 400, test tenant system 410 is configured to execute one or more applications which are also executed by tenant systems 110, and therefore stores data dictionary 414 which defines data 412 used by the one or more applications. Test data generator 420 may populate data 412 with sample data at S305 as is known in the art. The sample data may conform to constraints set forth in the corresponding data definitions (e.g., of data dictionary 414). In some embodiments, more than one test tenant system is generated at S305.

Regardless of how the one or more sets of test data are generated at S305, first consistency constraints are determined based on the corresponding data definitions at S310. As described above, data definitions (e.g., data dictionary 414a) may explicitly specify constraints on a set of test data (e.g., data 412a). Such constraints may include but are not limited to semantic data types, foreign key relationships, and content constraints managed by the application (e.g., a string or varchar field shall contain a timestamp, a length of a value is less than the maximum length of its data type, values may only include a subset of the possible values conforming to the data type).

Next, at S315, second consistency constraints are determined based on the one or more sets of data. For example, a respective agent of each test system scans the set of test data of the test system to determine one or more constraints based on the values stored in the columns of the set of test data. The first and second constraints may be stored as described above. An identifier of each constraint may be stored in conjunction with an identifier of the table column to which the constraint applies, an identifier of the type of constraint, and any additional values which may be needed to define the constraint, such as a list of values of a value set.

Inconsistent data in one or more sets of production data is identified at S320 based on the determined first and second consistency constraints. Each of the one or more sets of production data is stored by a respective production tenant system (e.g., one of tenant systems 110), which includes actual operational tenant data and which is different from the test tenant systems from which the first and second consistency constraints are determined. The data of the one or more sets of production data is evaluated against the first and second consistency constraints at S320 to identify inconsistent data.

Next, and for each identification of inconsistent data at S320, either the inconsistent data or an indication of the inconsistency is stored at S325. If the identified inconsistent data is not subject to privacy restrictions, the actual records of the production data which include columns exhibiting the inconsistent data (or a manageable subset thereof) are stored. If, for example, the actual records should not be copied (e.g., due to privacy considerations), an indication of the inconsistency (e.g., a "deviation pattern") s stored at S325.

Inconsistent data is generated based on the stored indications of inconsistency at S330. For example, one or more sample records may be created based on a stored deviation pattern associated with one of the determined second consistency constraints. The inconsistent data stored at S325 and the inconsistent data generated at S330 are inserted into each of the one or more sets of test data at S335. A test of a data consumer is then executed at S340 based on the thusly-modified one or more sets of test data.

Figure 5:
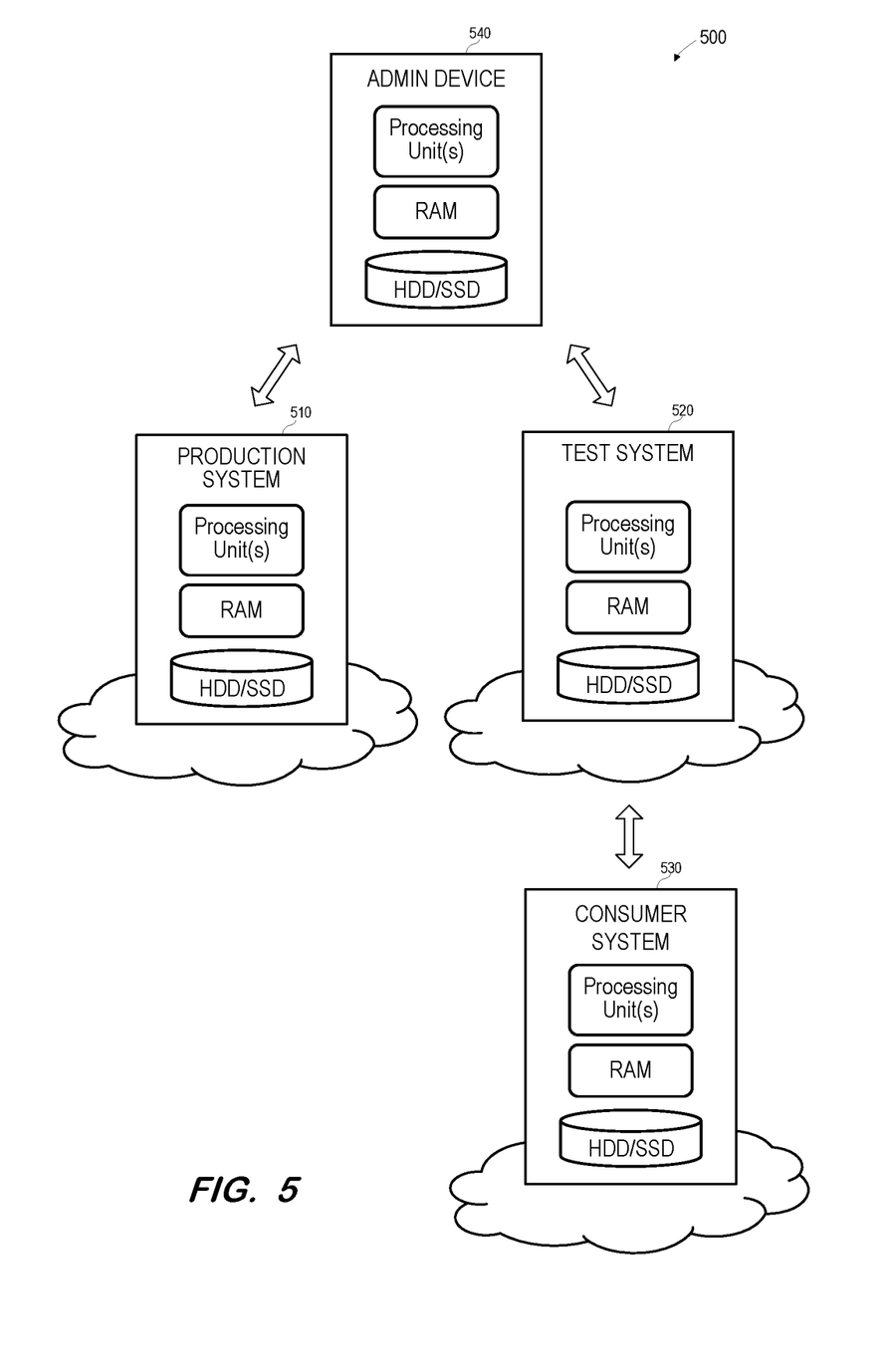
FIG. 5 is a block diagram of a cloud-based system according to some embodiments.

FIG. 5 illustrates cloud-based database deployment 500 according to some embodiments. Production system 510, test system 520 and consumer system 530 may each comprise cloud-based compute resources, such as virtual machines, allocated by a public cloud provider providing self-service and immediate provisioning, autoscaling, security, compliance and identity management features.

Production system 510 may execute an application to service several tenant accounts, each of which is associated with logically-separated tenant data stored in production system 510. Users associated with a tenant may access production system 510 and interact with the application to view, manage or otherwise use the particular tenant data associated with the tenant. Test system 520 may implement one or more test tenant accounts. Each test tenant account may be associated with separate tenant data, which may initially comprise a copy of data of a tenant account of production system 510. Embodiments are not limited to one production system or one tenant system.

Admin device 540 may interact with agents executing on test system 520 to determine constraints based on metadata and data of each test tenant of test system 520. Admin device 540 may store information associated with the constraints. This information may be used by agents executing on production system 510 to identify inconsistent data stored in production system 510. Based on the identified inconsistent data, inconsistent data is inserted into the tenant data of test system 520 as described above. Consumer system 530 may execute tests based on the data of test system 520. These tests may therefore determine whether consumer system 530 would suitably handle inconsistent data which may be encountered within a corresponding production system.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used to implement an embodiment may include a programmable processor to execute program code such that the computing device operates as described herein.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A system comprising:
   a test tenant system comprising test instances of database tables and metadata defining first constraints on columns of the database tables;
   a constraint identifier component to determine second constraints based on data stored in the columns of the test instances of the database tables;
   a plurality of tenant systems, each of the plurality of tenant systems comprising respective tenant instances of the database tables;
   an inconsistency identifier component to identify, based on the first constraints and the second constraints, a plurality of inconsistent data stored in the columns of the tenant instances of the database tables which does not satisfy at least one constraint of the first constraints and the second constraints; and
   an inconsistency generator component to generate records based on the identified plurality of inconsistent data and to add the generated records to the test instances of the database tables based on the identified plurality of inconsistent data.

2. A system according to claim 1, the inconsistency identifier component to store a first plurality of sample records associated with first identified inconsistent data,
   wherein adding records to the test instances of the database tables comprises adding the first plurality of sample records to the test instances of database tables.

3. A system according to claim 2, the inconsistency identifier component to store a second plurality of indications associated with second identified inconsistent data,
   the inconsistency generator component to generate a second plurality of records based on the second plurality of indications,
   wherein adding records to the test instances of the database tables comprises adding the first plurality of sample records and the second plurality of records to the test instances of database tables.

4. A system according to claim 1, further comprising a second test tenant system comprising second test instances of the database tables, the test instances of database tables of the test tenant system comprising a copy of a first one of the tenant instances of the database tables of the tenant system and the second test instances of database tables comprising a copy of a second one of the tenant instances of the database tables of the tenant system,
   wherein the constraint identifier component is to determine third constraints based on data stored in the columns of the second test instances of the database tables, and
   wherein the inconsistency identifier component is to identify the plurality of inconsistent data stored in the columns of the tenant instances of the database tables which does not satisfy at least one of the first constraints, the second constraints and the third constraints.

5. A system according to claim 4, the inconsistency identifier component to store a first plurality of sample records associated with first identified inconsistent data and a second plurality of indications associated with second identified inconsistent data,
   the inconsistency generator component to generate a second plurality of records based on the second plurality of indications, and
   wherein adding records to the test instances of the database tables comprises adding the first plurality of sample records and the second plurality of records to the test instances of database tables.

6. A system according to claim 1, the test instances of database tables of the test tenant system comprising a copy of a first one of the tenant instances of the database tables of the tenant system.

7. A system according to claim 6, the inconsistency identifier component to store a first plurality of sample records associated with first identified inconsistent data and a second plurality of indications associated with second identified inconsistent data,
   the inconsistency generator component to generate a second plurality of records based on the second plurality of indications, and
   wherein adding records to the test instances of the database tables comprises adding the first plurality of sample records and the second plurality of records to the test instances of database tables.

8. A method comprising:
   determining first constraints on data stored within columns of database tables of a test tenant system based on metadata associated with the columns of database tables;
   determining second constraints on the data stored within the columns of database tables based on the data stored in the columns of database tables of the test tenant system;
   identifying first data stored in columns of database tables of a plurality of tenant systems which does not satisfy at least one constraint of the first constraints and the second constraints;
   generating records based on the identified first data;
   adding the generated records to the database tables of the test tenant system; and
   executing a test using the database tables of the test tenant system including the added records.

9. A method according to claim 8, wherein identifying the first data stored in columns of database tables of the plurality of tenant systems comprises storing a first plurality of sample records of the database tables of the plurality of tenant systems which are associated with the first identified data, and
   wherein adding records to the database tables of the test tenant system comprises adding the first plurality of sample records to the database tables of the test tenant system.

10. A method according to claim 9, wherein identifying the first data stored in columns of database tables of the plurality of tenant systems comprises storing a second plurality of indications associated with second identified inconsistent data,
  wherein adding records to the database tables of the test tenant system comprises generating a second plurality of records based on the second plurality of indications and adding the first plurality of sample records and the second plurality of records to the database tables of the test tenant system.

11. A method according to claim 8, further comprising:
determining third constraints on data stored within columns of database tables of a second test tenant system based on the data stored in the columns of database tables of the second test tenant system, the columns of database tables of the test tenant system comprising a copy of the columns of database tables of a first one of the plurality of tenant instances and the columns of database tables of the second test tenant system comprising a copy of the columns of database tables of a second one of the plurality of tenant instances,
  wherein identification of first data stored in columns of database tables of the tenant system is based on the first constraints, the second constraints and the third constraints, and
  wherein records are added to the database tables of the second test tenant system based on the identified first data; and
  wherein the test is executed using the database tables of the test tenant system including the records added to the test tenant system and the database tables of the second test tenant system including the records added to the second test tenant system.

12. A method according to claim 11, wherein identifying first data stored in columns of database tables of the plurality of tenant systems comprises storing a first plurality of sample records of the database tables of the plurality of tenant systems which are associated with first data,
  wherein identifying first data stored in columns of database tables of the tenant system comprises storing a second plurality of indications associated with second identified inconsistent data, and
  wherein adding records to the database tables of the test tenant system comprises generating a second plurality of records based on the second plurality of indications and adding the first plurality of sample records and the second plurality of records to the database tables of the test tenant system.

13. A method according to claim 8, the columns of database tables of the test tenant system comprising a copy of the columns of database tables of a first one of the plurality of tenant instances.

14. A method according to claim 13, wherein identifying first data stored in columns of database tables of the plurality of tenant systems comprises storing a first plurality of sample records of the database tables of the plurality of tenant systems which are associated with first data,
  wherein identifying first data stored in columns of database tables of the tenant system comprises storing a second plurality of indications associated with second identified data, and
  wherein adding records to the database tables of the test tenant system comprises generating a second plurality of records based on the second plurality of indications and adding the first plurality of sample records and the second plurality of records to the database tables of the test tenant system.

15. A non-transitory medium storing program code, the program code executable by a processing unit to cause a computing system to:
  determine first constraints on data stored within columns of database tables of a test tenant system based on metadata associated with the columns of database tables;
  determine second constraints on the data stored within the columns of database tables based on the data stored in the columns of database tables of the test tenant system;
  identify first data stored in columns of database tables of a plurality of tenant systems which does not satisfy at least one constraint of the first constraints and the second constraints;
  generate records based on the identified first data;
  add the generated records to the database tables of the test tenant system; and
  execute a test using the database tables of the test tenant system including the added records.

16. A medium according to claim 15, wherein identification of the first data stored in columns of database tables of the plurality of tenant systems comprises storing a first plurality of sample records of the database tables of the plurality of tenant systems which are associated with first data, and
  wherein adding of records to the database tables of the test tenant system comprises adding the first plurality of sample records to the database tables of the test tenant system.

17. A medium according to claim 16, wherein identification of first data stored in columns of database tables of the plurality of tenant systems comprises storage of a second plurality of indications associated with second identified data,
  wherein adding of records to the database tables of the test tenant system comprises generating a second plurality of records based on the second plurality of indications and adding of the first plurality of sample records and the second plurality of records to the database tables of the test tenant system.

18. A medium according to claim 15, the program code executable by a processing unit to cause a computing system to:
  determine third constraints on columns of database tables of a second test tenant system based on data stored in the columns of database tables of the second test tenant system, the columns of database tables of the test tenant system comprising a copy of the columns of database tables of a first one of the plurality of tenant instances and the columns of database tables of the second test tenant system comprising a copy of the columns of database tables of a second one of the plurality of tenant instances,
  wherein identification of first data stored in columns of database tables of the tenant system is based on the first constraints, the second constraints and the third constraints, and
  wherein records are added to the database tables of the second test tenant system based on the identified first data; and
  wherein the test is executed based on the database tables of the test tenant system including the records added to the test tenant system and on the database tables of the second test tenant system including the records added to the second test tenant system.

19. A medium according to claim 18, wherein identification of first data stored in columns of database tables of the plurality of tenant systems comprises storing a first plurality of sample records of the database tables of the plurality of tenant systems which are associated with first identified data,
  wherein identification of first data stored in columns of database tables of the tenant system comprises storing a second plurality of indications associated with second identified data, and
  wherein adding of records to the database tables of the test tenant system comprises generation of a second plurality of records based on the second plurality of indications and adding of the first plurality of sample records and the second plurality of records to the database tables of the test tenant system.

20. A medium according to claim 15, the columns of database tables of the test tenant system comprising a copy of the columns of database tables of a first one of the plurality of tenant instances,
  wherein identification of first data stored in columns of database tables of the plurality of tenant systems comprises storing a first plurality of sample records of the database tables of the plurality of tenant systems which are associated with first identified data,
  wherein identification of first data stored in columns of database tables of the tenant system comprises storing a second plurality of indications associated with second identified data, and
  wherein adding of records to the database tables of the test tenant system comprises generating a second plurality of records based on the second plurality of indications and adding of the first plurality of sample records and the second plurality of records to the database tables of the test tenant system.

* * * * *